J. R. BUCHANAN.
INDUSTRIAL CAR RECORD BOOK.
APPLICATION FILED OCT. 20, 1919.
1,378,654.
Patented May 17, 1921.
2 SHEETS—SHEET 1.
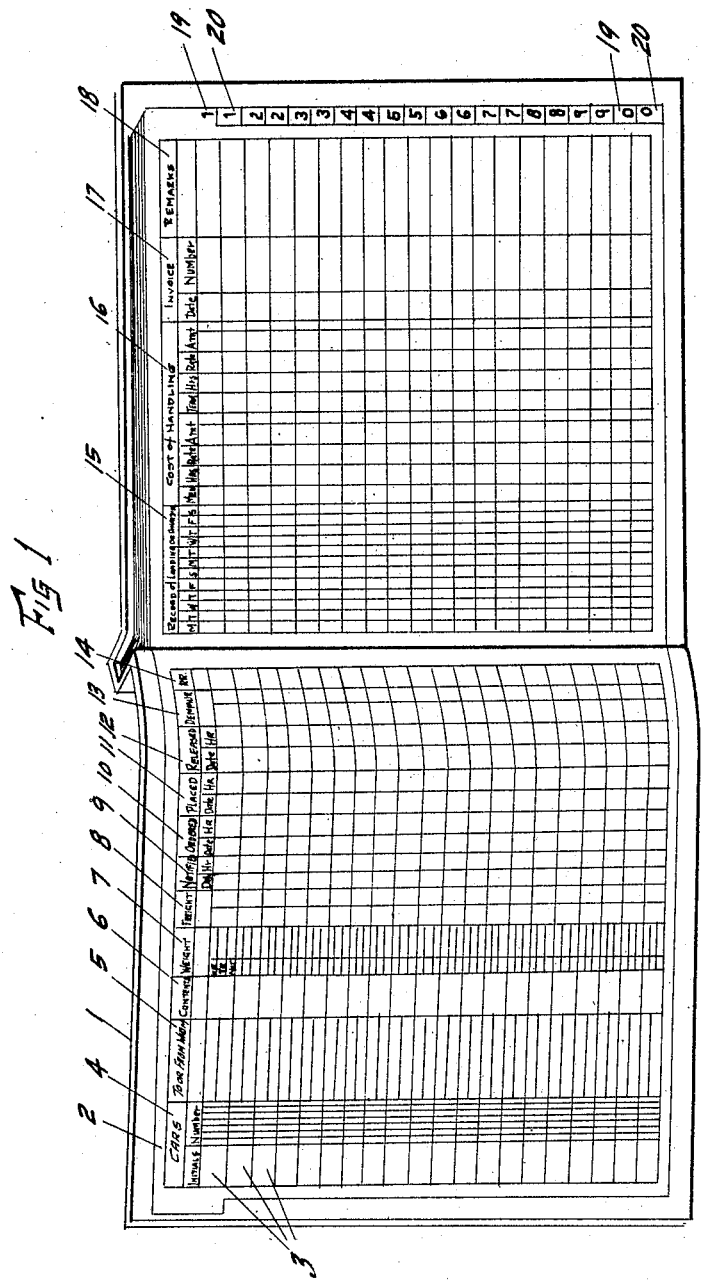
INVENTOR
J. R. BUCHANAN
BY
ATTORNEY

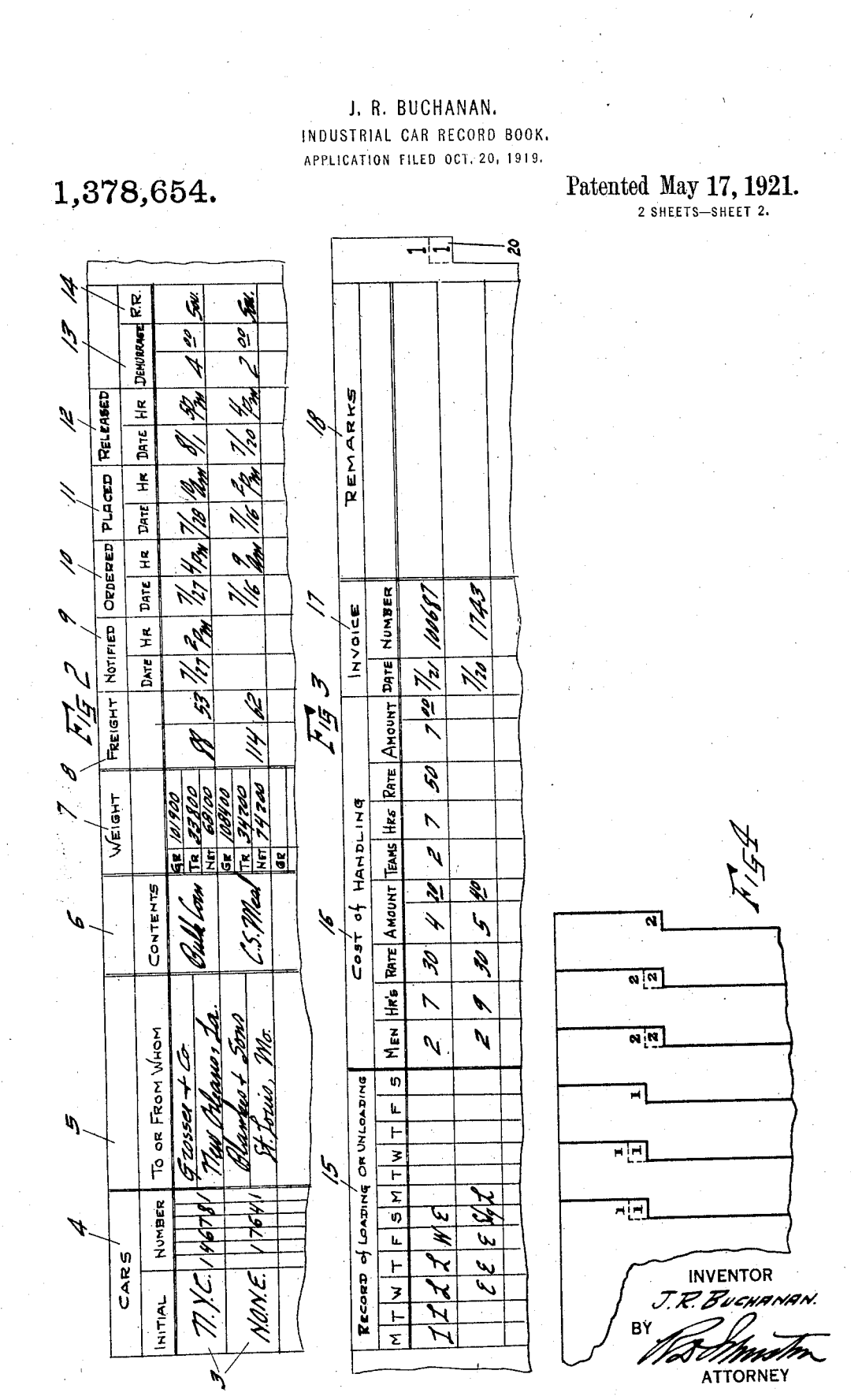

J. R. BUCHANAN.
INDUSTRIAL CAR RECORD BOOK.
APPLICATION FILED OCT. 20, 1919.

1,378,654.

Patented May 17, 1921.
2 SHEETS—SHEET 2.

UNITED STATES PATENT OFFICE.

JAMES R. BUCHANAN, OF HUNTSVILLE, ALABAMA.

INDUSTRIAL CAR-RECORD BOOK.

1,378,654. Specification of Letters Patent. Patented May 17, 1921.

Application filed October 20, 1919. Serial No. 331,838.

*To all whom it may concern:*

Be it known that I, JAMES R. BUCHANAN, a citizen of the United States of America, residing at Huntsville, in the county of Madison and State of Alabama, have invented certain new and useful Improvements in Industrial Car-Record Books, of which the following is a specification.

My invention relates to an industrial car record book which is especially designed for use by industries to keep a record of the detention and loading or unloading of cars and to furnish a reference and index for supplying all information necessary for the settlement of claims and for furnishing various other data concerning car-load shipments.

The object of my record is to present in condensed form and in a manner most convenient for reference, the varied information which may be needed in a plant accounting system to deal with claims, demurrage, cost of loading or unloading, and for figuring profits on car-load shipments, always utilizing the number as an index. As practically all correspondence regarding car-load shipments gives the car initial and number, the latter is used as a base for indexing my book and I subdivide the leaves of the latter into ten series in which the terminal digits of the car or index numbers progress by series numerically from 1 to 0. Preferably all data pertaining to one car-load shipment are displayed in a horizontal column across the two oppositely facing pages.

The several leaves in each series are provided with novel indexing tabs to facilitate access to the working sheet. To this end the several leaves of a series, except the last leaf, are provided with superimposed detachable index tabs similarly marked to display the characteristic numeral digit of the series, the last leaf of the series having a single permanent tab underlying the detachable tabs of the preceding leaves of the series. As the pages are filled the removable tabs are detached, thereby leaving exposed the index tab of the working sheet and avoiding much inconvenience and delay in the handling of the book for reference and entry.

My invention will be better understood by reference to the accompanying drawings which form a part of this specification, and in which:—

Figure 1 shows my improved industrial car record book exposing pages of the first series.

Figs. 2 and 3 show the left and right hand pages displayed in Fig. 1 with complete entries illustrative of the use of my record book.

Fig. 4 is a detail view illustrating the last three leaves of the first series and the first two leaves of the second series in plan view with their edges, bearing the permanent and detachable indexing tabs, projecting one beyond the other so as to more clearly show the relative position of such tabs in the series.

Similar reference numerals refer to similar parts throughout the drawings.

I have illustrated my invention in the form suitable for an industrial car record book, the book comprising a binding 1 which may be of the permanent or loose leaf type and contains ten series of leaves, each series comprising preferably ten leaves. The oppositely facing pairs of pages throughout the several series are similarly ruled and headed, being preferably arranged as follows: The left hand sheet 2 of each pair is subdivided into a series of main horizontal entry columns 3 and these columns are in turn intersected by main vertical columns 4, 5, 6, 7, 8, 9, 10, 11, 12, 13 and 14, which are successively headed "Cars," "To and from whom," "Contents," "Weight," "Freight," "Notified," "Ordered," "Placed," "Released," "Demurrage," and "R. R." The column 4 headed "Cars" is subdivided into two vertical sub-columns, one headed "Initial" and the other headed "Number." The column 7 is provided with horizontal sub-rows in each column 3 which are respectively headed at the left "Gr," "Tr" and "Net," abbreviations of gross, tare and net weight.

Each right hand page is subdivided into four main vertical columns 15, 16, 17 and 18, respectively headed "Record of loading," "Cost of handling," "Invoice" and "Remarks." The page below the headings is subdivided by horizontal main columns 3 alining with the columns 3 on the opposite left hand page. The main column 15 is preferably subdivided into twelve sub-columns respectively headed by letters indicating the days of the week and thus providing sub-columns for each working day of two weeks. A lesser period may be indicated if desired. The main column 16 is subdivided into eight vertical sub-columns respectively headed "Men," "Hrs," "Rate," "Amt." "Teams," "Hrs," "Rate," "Amt." The main column 17 is subdivided into two vertical sub-columns respectively, "Date" and "Num." If desired, as shown in Fig. 3, the column 15 may be headed "Record of loading or unloading."

Each sheet is preferably provided with a permanent index tab 19 but each sheet of the series except the last sheet must have a detachable index tab 20. The permanent tabs are all marked with index numerals to correspond with the characteristic terminal digit of the car numbers to be entered in such series, it being intended that all car numbers ending in the numeral 1 shall be recorded in the first series, all car numbers ending in the digit 2 in the second series, and so on throughout the ten series. The indexing numeral of the first series will be therefore "1" and this will be displayed both on the permanent and on the detachable tabs of the several leaves of the series, it being noted that the detachable tabs of the first nine pages all lie superimposed one on the other, and that they overlie the indexing numeral on the permanent tab of the last leaf of the series, which tab is elongated to project below the permanent tabs of the preceding leaves of the series.

As car record data are entered and the pages of each series are filled beginning from the front, the detachable tabs 20 are removed as their respective pages are filled, thereby exposing the detachable tab of the working sheet, which process continues until the permanent tab of the last page is exposed, when the entries in such series are approaching completion. I thus avoid much unnecessary turning and handling of the leaves in the several series and enable the book to be opened immediately to the working sheet for entries or reference.

The particular arrangement of the columns and headings already described is especially designed for keeping a condensed and readily accessible record which will display all data pertaining to each car which is loaded or unloaded. Thus, for instance, in the illustrative data of two cars given in Figs. 2 and 3, it is apparent that "N Y C" car 146781 from Groner & Co., New Orleans, containing bulk corn with a gross weight of 101,900 lbs., tare of 33,800 lbs. and net weight of 68,100 lbs., had arrived subject to a freight charge of $88.53, notice being received July 27th at 2 p. m. On the same date at 4 p. m. the car was ordered placed and it was placed on the following day at 10 a. m. The car was ordered released on August 1st at 5 p. m. subject to a demurrage charge of $4.00 payable to the Southern Railroad. In handling this car the record on the opposite page shows that the car stood loaded awaiting unloading on Monday, Tuesday, Wednesday and Thursday, that on Friday the car was worked and on Saturday it was empty, this information being conveyed by the initials "L" for "Loaded," "W" for "Working", and "E" for "Empty". It also shows that two men occupied seven hours in unloading the car, their wage rate being 30¢, making the unloading cost $4.20, and that two teams were employed for seven hours at the rate of 50¢, costing $7.00. The date and number of the invoice appear in column 17. From this record it is possible for an industrial plant to ascertain any data that may be needed in reference to each car-load shipment and reference can readily be made to any car-load shipment by turning to the series having the same terminal digit as the car and looking through column 4 until the particular car is located by its initial and number.

The second illustrative record differs from the first largely in the fact that in column 15 it appears that the car was ordered on the 16th and placed on that date and that it stood empty on Wednesday, Thursday and Friday, was loading on Saturday and was loaded on Monday and released, there being $2.00 demurrage in this case, the letters "E", "L D G" and "L" indicating, respectively, "Empty", "Loading" and "Loaded".

Obviously, the special arrangement of these columns and their sequence and the exact subject matter to be displayed therein may be varied to meet different working conditions, but the form disclosed will display completely all data that may be required and all or any part of the form may be utilized as may be desired by each individual plant.

It will also be understood that the book is adapted for entry of data relating to claims or other matters, the headings and columns being appropriately modified.

What I claim as new and desire to secure by Letters Patent, is:—

1. In a book of the character described, a plurality of series of leaves, leaves of each series comprising permanent and detachable tabs with like indexing indicia displayed thereon, the detachable tabs being superimposed in each series, and the last leaf of each series having its permanent tab underlying the detachable tabs of the preceding pages of its respective series.

2. A record book having its leaves subdivided into series, the leaves of each series having permanent tabs, the several leaves of each series, excepting the last, having also superimposed detachable tabs, the last leaf of each series having its permanent tab underlying the detachable tabs of the preceding leaves of its respective series, there being identical indexing indicia displayed on detachable tabs and said last permanent tab of a series.

3. A record book having its leaves subdivided into ten series, the leaves of each series having permanent indexing tabs, the several leaves of each series, excepting the last, having also superimposed detachable tabs, the last leaf of each series having its permanent tab elongated to underlie the detachable tabs of the preceding leaves of its respective series, there being an identical indexing numeral displayed on both the permanent and detachable tabs of a series, said indexing numerals of each series progressing numerically by series from 1 to 0.

4. A record book of the character described comprising a series of leaves having oppositely facing pages ruled into horizontal columns headed by a column appropriately designated to indicate a car number and initial, the horizontal columns being subdivided by vertical columns appropriately headed to designate the source or destination of the car, and data indicating the placing and loading or unloading of the car, said data comprising a group of columns successively headed to indicate the days of the week in their order.

In testimony whereof I affix my signature.

JAMES R. BUCHANAN.

Witness:
R. C. BIBB.